Nov. 11, 1952 J. E. CLARK 2,617,194
BACKING FOR DENTAL RESTORATIONS
Filed Jan. 20, 1951
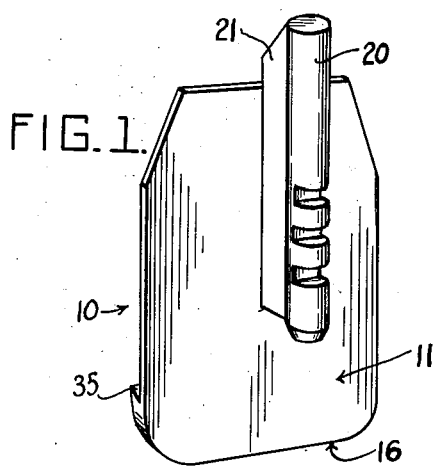
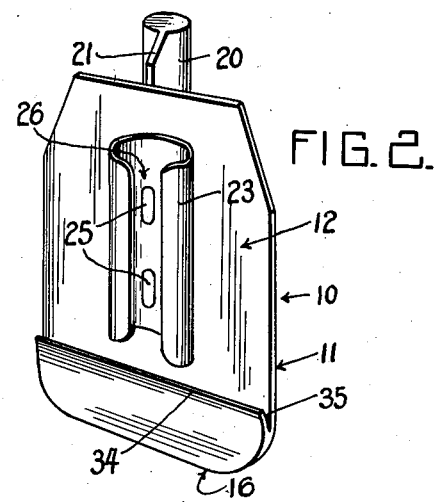
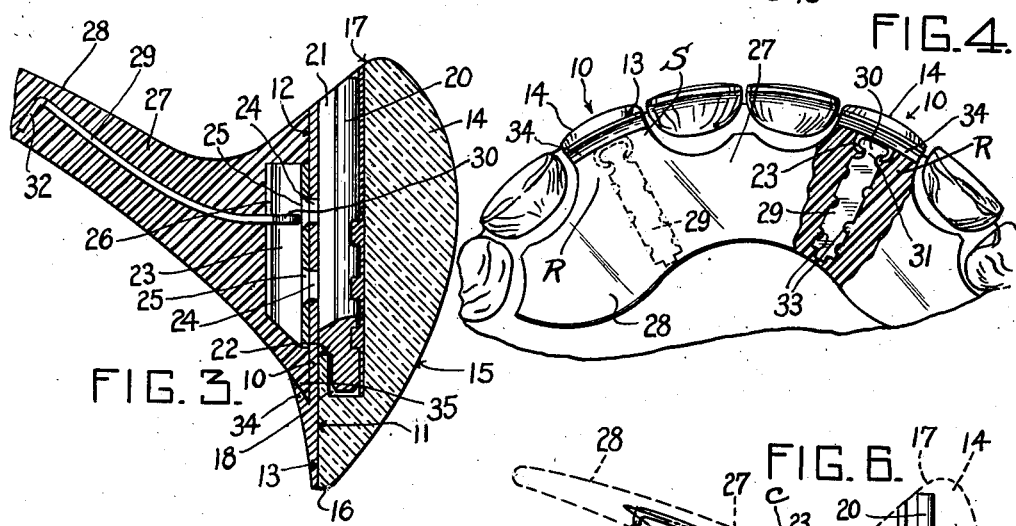
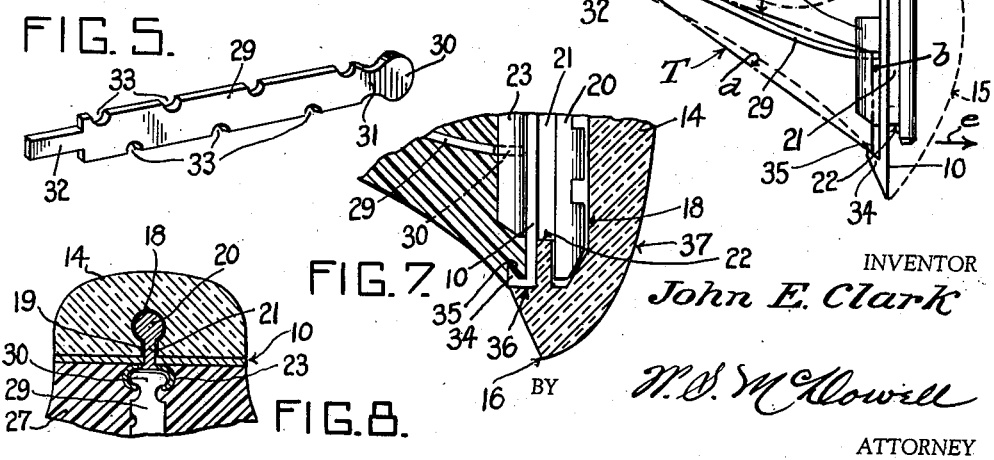
INVENTOR
John E. Clark
BY M. S. McDowell
ATTORNEY Patented Nov. 11, 1952

2,617,194

UNITED STATES PATENT OFFICE 2,617,194

BACKING FOR DENTAL RESTORATIONS

John E. Clark, Springfield, Ohio, assignor to The Columbus Dental Manufacturing Co., Columbus, Ohio, a corporation of Ohio Application January 20, 1951, Serial No. 207,019

8 Claims. (Cl. 32—2)

This invention relates to the formation of dental restorations, such as dentures or other similar appliances, having particular reference to restorations utilizing metallic backings for the mounting of artificial teeth in association with denture base members of molded, fabricated and/or cast composition.

In such artificial dentures, there exists at present certain mechanical weaknesses in the retention means now commonly employed in joining the tooth with the usual molded materials of associated denture bases. Frequently, such denture bases, when subjected to the strains produced by articulation and mastication, and other conditions of use, flex and break across the isthmus span joining the tooth with the body of a denture base. Under such conditions, the stresses and strains, instead of being distributed in a uniform manner throughout the component parts of the restoration, are applied locally on unsupported or unreinforced regions, causing mechanical failure.

An object of the invention is to provide an improved backing for use in artificial tooth restorations in which novel connecting means are provided for effecting a strong, positively braced and relatively inseparable union between the molded composition materials of the denture base members and tooth backings carried thereby.

Another object is to provide a backing in which the lingual surface thereof is provided with a rigid, stationarily mounted, and rearwardly projecting retention member with which the molded or other material of an associated denture base will conform when in a formative or plastic state, whereby upon subsequent hardening, curing or setting of such moldable materials, the same will serve to lock, grip and retain in a positive and effective manner the metallic backing in association with the denture base.

A further object is to provide in connection with such a backing-retention member an adjustable, laterally projecting reinforcing bar, the latter having a forward end adjustably connected with the retention member on the lingual surface of the associated backing and its flexible body portion embedded in the molded materials of the denture base, particularly when such materials are of acrylic or other plastic composition, whereby to receive tension and shear forces, distributing such forces over a large area of the denture base, and reinforcing and holding the backing and denture base in unitary relationship and strengthening the normally weak isthmus spans of the denture base.

Still a further object is to provide a backing of this character having its lingual surface formed with an undercut shoulder forming a plastic-receiving channel extending adjacent to the incisal edges of the backing and associated tooth facing and operating to impart to the denture appliance a substantially triangular thrust or force-receiving geometric pattern, by which properties of high mechanical strength are imparted to the appliance. Again, an object is to utilize said shoulder and channel as a means for receiving the molded composition materials of the associated denture base and around desired surfaces of the backing; and to provide an improved backing which lends itself readily to proper fitting and firm mechanical mounting of artificial teeth in the mouth in accordance with individual requirements and articulation peculiarities.

Accordingly, the present invention consists in the provision of a composite denture backing having a plate-like body formed with labial and lingual surfaces, the labial surface of the backing being provided with a stationary vertically disposed post, the latter forming a receiving means by which tooth facings are adapted to be interchangeably attached to the backing, and wherein the lingual surface of said backing is provided with a socketed retention member disposed in parallel relation with the post, said retention member being so formed that moldable denture base-forming materials, when in a plastic state, may enter the retention member and conform to its configuration, so that upon subsequent setting, curing or hardening of said materials, the same will be brought into interlocking engagement with the retention member to inseparably secure the backing in association with a denture base produced by the molded materials in and about the retention member.

The invention further consists in the provision of an adjustable elongated tension-receiving reinforcing bar having a bendable body which is adapted to be adjustably connected at one end with the aforesaid retention member of the backing, the bendable body of the bar being molded and embedded in the moldable materials of an associated denture base, whereby to reinforce isthmus spans and supplement and assist the retention member in locking the associated backing in firmly anchored retention in connection with the molded materials of the denture base, producing a mechanically strong, structurally simple and lightweight dental appliance.

The invention, also, consists in forming the lingual surface of a composite backing, having a retention member and associated reinforcing bar, with an undercut channel-forming shoulder adapted to be embedded in the moldable composition materials of an associated denture base, and wherein the completed appliance provides a substantially triangular stress-receiving pattern which braces the backing at positions close to the incisal edges of the teeth.

For a further understanding of the invention, reference is to be had to the following description and to the accompanying drawings, wherein:

Fig. 1 is a perspective view of my improved backing for dental appliances, disclosing the appearance of the backing when observed from its front or labial side, and showing the mounting post for the interchangeable reception of tooth facings provided on the backing;

Fig. 2 is a similar view looking toward the rear or lingual surface of the backing, showing the stationary base anchoring and retention member formed therewith;

Fig. 3 is a vertical sectional view taken through the backing when the same is operatively positioned in a denture appliance having, in addition to the backing, a base and a tooth facing;

Fig. 4 is a plan view, partly in horizontal cross section, disclosing the flexible reinforcing bar used in conjunction with the retention member of the backing and joining the latter with a denture base;

Fig. 5 is a detail perspective view of the reinforcing bar;

Fig. 6 is a diagrammatic view showing the stress-receiving pattern of my improved denture appliance;

Fig. 7 is a vertical sectional view similar to that of Fig. 3, but disclosing a modified type of backing for use in connection with a tooth facing having an unbacked or all-porcelain incisal edge;

Fig. 8 is a detail horizontal sectional view taken through the backing of its associated facing.

In the drawings, the numeral 10 indicates my improved composite backing in its entirety. In this instance, the same is formed to comprise a relatively thin plate-like body of a non-corrosive metal, although other suitable materials may be used. As shown, the plate-like body of the backing includes a front or labial surface 11 and a rearwardly facing lingual surface 12. Marginally, the plate conforms to the approximating marginal configuration of the flat lingual surface 13 of an artificial tooth facing 14. The latter may be of the usual all-ceramic or porcelain composition, or it may be formed from one of the so-called plastic materials now used to some extent in tooth construction.

The facing 14, as shown, is an anterior and includes a substantially convex labial surface 15, an incisal edge 16 and an inclined or beveled gingival surface 17. Formed in the facing is the usual post-receiving hole 18 which communicates with a slot 19, the width of the latter being less than that of the diameter of the hole 18.

Provided on the front or labial surface 11 of the backing is a stationary post 20, the latter comprising the usual tenon which is received in the mortise of a tooth facing composed of the hole 18 and the slot 19, while the post includes a web 21 of reduced thickness which is receivable in the slot 19, with the post proper occupying in the hole 18 of the facing. It will be noted that the post hole 18 is of greater length than the slot 19, that is, it projects to a greater extent toward the incisal edge 16 of the facing than does the slot.

In this construction, a shoulder 22 is formed at the bottom, or closed end, of the slot 19, which acts as a limiting abutment in inserting a tooth facing on the backing. The spacing of these parts is such that when the shoulder 22 is contacted by the bottom or inner end of the post web 21, the extreme lower or inner end of the post 20 is spaced from the bottom of the hole 18. Preferably, the facing is retained in connection with the backing on the post 20 thereof by the added aid of a thin coating of cementing material applied to the inner faces of the backing and facing. In the event a facing becomes damaged in use, it is readily possible to replace the same in a denture having the construction set forth by removing the damaged facing and replacing the same with a new facing. Ordinarily, all facings have their lingual surfaces provided with the standardized post-receiving holes and slots.

In accordance with the present invention, I provide the lingual surface 12 of the backing with a retention member 23, which may be generally of tubular form. The latter occupies the medial portion of the lingual surface of the backing and is arranged substantially in parallel relation with the post 20 on the labial surface of the backing. In fact, it is advantageous in the manufacture of my improved backing to form the backing-engaging edge of the post web 21 with spaced rivet-forming projections 24. These projections are adapted to extend through aligned openings provided in the backing and in the retention member or tube 23, the rear or lingual ends of the projections 24 being headed as at 25 to firmly join in a mechanical sense the three component parts of the backing, namely, its body, the facing-receiving post and the denture-base anchoring retention member.

As shown, the retention tube or member is generally of cylindrical or socketed formation provided on the lingual side thereof with a vertical slot 26, the width of which is considerably less than that of the maximum internal diameter of the retention member. By the use of this retention member or tube, provision is made for positively and inseparably securing the backing in operative association with the molded body 27 of a denture base 28. Usually, the body 27 is formed out of a plastic such as an acrylic composition although other cast, fabricated or moldable materials common in denture formation may be used. The molded materials of the denture base when in plastic form enter the retention member or tube and substantially fill the same, so that when said molded materials set, harden or cure, the same form locking keys inside the retention member which, in effect, integrally bond and embed the backing in the composition of the denture base.

To further assist in this function, I utilize a metallic strip 29 constituting a tension-receiving reinforcing bar. In one of its preferred embodiments, as shown in Fig. 5, this bar is formed at its forward end with a tongue 30 joined with a reduced neck region 31, the tongue 30 being slidably received in an adjustable manner in the retention tube 23 with the neck region 31 extending through the slot of the retention member. The body of the bar or strip 29 is bendable so that it may be readily shaped to accord with the configuration of the molded body portion of the denture base.

At its extreme inner end, the reinforcing bar is reduced in width and includes a tang 32. At the time of molding, the tang may be bent so that it extends perpendicularly or otherwise to the general plane of the bar for the purpose of holding the bar firmly into the plaster investment-forming material while the denture base is being processed. Following the completion of the appliance, the protruding tang which extends beyond the denture base is eliminated. The side edges of the body of the reinforcing bar may be notched or serrated in staggered or offset order, as at 33, to hold the same immovably anchored in the denture base.

With this construction, it will be observed that when the denture base has been finally formed, the molded materials comprising the body thereof will join and cover the lingual side 12 of the backing, extending from the gingival edge of the backing to a transversely extending channel shoulder 34, which extends across the lingual surface 12 above or in spaced relation from its incisal edge, as the construction is viewed in Fig. 2. The shoulder 34 acts as a guide in the molding and finishing of the denture base, assisting the dentist, or other technician, in the shaping of the body of the denture base, and in operatively locating the backing with respect to the denture base. In this operation, the retention tube or member 23 is entirely surrounded by and embedded in the composition materials forming the denture base. During such molding, the tongue 30 of the bar 29 is located at a desired position in the retention member 23, with the body of said bar bent to conform with the oral anatomy to which the denture base is applicable, so that when the latter cures, hardens or solidifies, the bar will be positioned in such manner therein as to receive both shear and tensioning forces which otherwise would tend to separate the backing from the denture base or to break the isthmus span S of the denture base. Preferably, the shoulder 34 is undercut as at 35, so that the plastic material of the denture base will enter the undercut in a manner producing a close bond, devoid of uneven edges.

By reference to Fig. 6, it will be noted that the undercut channel-forming shoulder, shown at 34 and 35, receives the plastic body material of the denture base. When the bar 29 is used in association with the retention member 23, a triangular stress-receiving pattern T is set up in the denture appliance in the regions bounded by the base line b represented by the extreme outer end of the bar at the point where its tongue 30 is joined with the retention member, and extending to the undercut shoulder 34. The altitudinal boundary of the pattern is represented by the line c which extends from the tongue 30 to the tang 32 and the hypotenusal boundary of the pattern by the line d extending from the tang 32 to the channel shoulder 34.

This thrust or stress-receiving pattern structure is particularly important in that it enables the backing and facing elements jointly to be reinforced or braced. Such reinforcing or bracing is accomplished relatively close to the incisal or biting edges. Damaging stresses and strains often created when the mouth is closed and the teeth of an individual are brought together, as in biting or in food mastication, and are transmitted in lateral directions, as indicated by the arrow e of Fig. 6. Through the pattern T, the backing is enabled to resist such outwardly directed lateral forces produced by articulation and thereby strengthen the denture generally.

Another particularly important feature of the present invention resides in the fact that the body of the reinforcing bar, as shown in Fig. 4, extends longitudinally through the isthmus region R of the denture base, particularly in the occurrence of isolated tooth replacements. This region comprises a comparatively narrow neck of plastic material which connects the main body portion of the denture base with the backing. It is this neck region which so frequently fractures, breaking in two, and since the neck is comparatively thin gauge at this point, as well as being narrow, it is highly important that the same be reinforced. The bar of the present invention functions effectively in providing an efficient reinforcement for this normally weak area of a denture.

In the form of my invention illustrated in Fig. 6, instead of extending the backing so that its incisal edge terminates coincidentally with that of the tooth facing, the backing of Fig. 6 has its incisal edge terminated above that of the facing, resting on a shoulder 36 provided on the lingual surface of the facing shown at 37. This produces an all porcelain incisal edge on the facing 37 which is desired in certain instances because of its color or light-transmitting properties when positioned in the mouth.

I claim:

1. A backing for artificial tooth dentures, comprising: a flat-surfaced plate-like body formed on opposite sides to provide a forwardly facing labial surface and a rearwardly facing lingual surface, a stationary tenon post carried by and projecting forwardly and centrally from the labial surface of said backing, a stationary tubular retention member arranged on and projecting rearwardly and centrally from the lingual surface of said backing in parallel relation with said post, and riveting projections extending integrally from the inner vertical edge of said post and passing through registering openings provided in said backing and retention member.

2. A backing for artificial tooth dentures, comprising: a flat-surfaced plate-like body formed on opposite sides to provide a forwardly facing labial surface and a rearwardly facing lingual surface, a stationary tenon post carried by and projecting forwardly and centrally from the labial surface of said backing, a vertically slotted and tubular stationary retention member arranged on and projecting rearwardly and centrally from the lingual surface of said backing, and a reinforcing bar adapted to be embedded in the molded body of an associated denture base, said bar embodying at its forward end a tongue slidably mounted for vertical adjustment in said retention member, said tongue providing for the application of tensioning forces to said bar when the latter is operatively positioned in the body of an associated denture base.

3. A backing for artificial tooth dentures, comprising: a plate-like body formed to provide a forwardly facing labial surface and a rearwardly facing lingual surface, means for uniting the tooth facing on the labial surface of said backing, a slotted tube stationarily mounted on the lingual surface of said backing, and a separable base-reinforcing bar having a forwardly disposed tongue slidably received in said retention tube for vertical adjustment with respect thereto.

4. An artificial tooth restoration comprising a denture base formed with a body of molded composition materials, a backing formed on its opposite sides to provide a forwardly facing labial surface and a rearwardly disposed lingual surface in contact with the body materials of said denture base, a stationary tenon post carried by and projecting forwardly and centrally from the labial surface of said backing for the detachable reception of a tooth facing, and a stationary vertically slotted retention tube arranged on and projecting rearwardly and centrally from the lingual surface of said backing, said tube being embedded in the molded body materials of said base.

5. A backing for artificial tooth dentures, comprising: a plate-like body formed on its opposite sides to provide a forwardly facing labial surface and a rearwardly disposed lingual surface, means provided on the labial surface of said backing for the detachable mounting of a tooth facing thereon, a stationary vertically slotted retention member arranged on and projecting rearwardly and centrally from the lingual surface of said backing, and a channeled shoulder extending laterally from and transversely of said surface adjacent the incisal edge thereof and in spaced relation from said retention member.

6. A backing for artificial tooth dentures, comprising: a plate-like body formed on its opposite sides to provide a forwardly facing labial surface and a rearwardly disposed lingual surface, means provided on the labial surface of said backing for the detachable mounting of a tooth facing thereon, a stationary vertically slotted retention member arranged on and projecting rearwardly and centrally from the lingual surface of said backing, and a shoulder extending laterally from and transversely of said surface adjacent the incisal edge thereof and in spaced relation from said retention member, said shoulder being undercut across and throughout its full width.

7. A backing for artificial tooth dentures, comprising: a plate-like body formed with oppositely disposed lingual and labial surfaces, a stationary tenon post carried by and projecting forwardly and centrally from said labial surface, a vertically slotted stationary retention tube arranged on and projecting rearwardly and centrally from said lingual surface, and riveting projections extending from said tenon post for disposal in coinciding openings present in said plate and tube means for mechanically uniting said tenon post and retention tube in unitary relationship with the plate-like body of said backing.

8. An artificial denture comprising a denture base of molded composition material, a tooth backing formed with an undercut shoulder adjacent to its incisal edge, a retention member carried by said backing and embedded in the material of said base, and an elongated reinforcing bar carried by said retention member and extending rearwardly in embedded relation in the denture base, said bar, retention member and undercut shoulder of said backing producing in the denture a substantially triangular force-absorbing structure.

JOHN E. CLARK.

REFERENCES CITED

The following references are of record in the file of this patent:

UNITED STATES PATENTS

| Number | Name | Date |
|---|---|---|
| 1,147,597 | Bishop | July 20, 1915 |
| 1,819,276 | Berger | Aug. 18, 1931 |
| 2,168,953 | Hankinson | Aug. 8, 1939 |

FOREIGN PATENTS

| Number | Country | Date |
|---|---|---|
| 411,451 | Great Britain | June 1, 1934 |
| 908,894 | France | Oct. 29, 1945 |